United States Patent [19]

Andersson et al.

[11] 3,952,850

[45] Apr. 27, 1976

[54] AUTOMATIC TICKET MACHINE

[75] Inventors: Carl-Axel Andersson; Béla Farkas, both of Alvsjo, Sweden

[73] Assignee: AB Cale Industri, Gavle, Sweden

[22] Filed: Jan. 16, 1975

[21] Appl. No.: 541,619

[30] Foreign Application Priority Data

Jan. 21, 1974 Sweden .............................. 7400728

[52] U.S. Cl. ................................ 194/1 N; 194/9 T; 194/DIG. 23; 340/51

[51] Int. Cl.$^{2}$ ............................................ G06F 9/00

[58] Field of Search ........... 194/1 N, 1 M, 1 L, 1 R, 194/9 R, 9 T, DIG. 3, DIG. 18, DIG. 22, DIG. 23; 340/51; 235/92 T

References Cited

UNITED STATES PATENTS

| | | | |
|---|---|---|---|
| 3,604,898 | 9/1971 | Magnusson | 194/9 R X |
| 3,729,617 | 4/1973 | Stone | 194/DIG. 23 X |
| 3,760,160 | 9/1973 | Gieringer et al. | 194/DIG. 23 X |
| 3,815,718 | 6/1974 | Singer | 194/DIG. 23 X |

*Primary Examiner*—Robert B. Reeves
*Assistant Examiner*—Joseph J. Rolla
*Attorney, Agent, or Firm*—Merchant, Gould, Smith, Edell, Welter & Schmidt

[57] ABSTRACT

An automatic ticket machine for parking areas having (a) an electronical central unit including a time generator, a plurality of registers, a pulse distributor, a supervisory unit, and a data table, (b) an optical display unit, and (c) a mechanical printing mechanism to provide a ticket permitting parking in the area for a period of time corresponding to a specific amount of money introduced into the machine.

14 Claims, 5 Drawing Figures

AUTOMATIC TICKET MACHINE

BACKGROUND OF THE INVENTION

1. Field of the Invention.

In contemporary society, the automobile has become a means of transportation which has been put to continually increasing utilization. However, the rapid expansion of the automotive industry has not only brought about advantages in terms of convenient means of transportation but also disadvantages, i.a. in the form of parking problems.

It has proved to be appropriate to charge fees for the use of certain parking places, and this invention specifically refers to a device that may be utilized in this connection, namely an automatic ticket machine which is intended to be disposed in a central location in a parking area, so that each driver parking his car will be able to purchase a ticket in the automatic machine and then may leave his car in the parking area for a period of time corresponding to the amount that he has paid.

This invention refers to an automatic ticket machine to be placed in a centralized location in a parking area and adapted to display optically and alternately the current time and the termination of a period of time for which payment has been made in the machine by the introduction of a specific amount of money, respectively, and to provide a printed ticket including information on the period of time paid for. In addition, if desired, the ticket machine of the invention can make it possible for a person having begun to introduce coins or bills into the machine to change his mind about parking at all and to be refunded his money on the condition that he has not pressed a ticket-feedout button in the machine.

2. Description of the Prior Art

Parking meters are known in the prior art, which are of purely mechanical type and which are allotted to cars individually, in other words each parking place is allotted an individual parking meter. These meters normally give an indication of the parking period by means of a pointer and a dial and hence they do not provide tickets.

Also, automatic ticket machines for being disposed in centralized locations in parking areas are known. These machines may be electronical to some extent.

Utilizing one parking meter for each individual parking place has the disadvantage that a great number of individual meters are necessary for a parking area of substantial size, with entailing high costs for purchase and maintenance, whereas prior art automatic ticket machines suffer from the drawback that they do not show both the current time and the hour when the right to park expires, nor do they enable a person having begun to utilize the machine to have his money returned to him if he changes his mind.

SUMMARY OF THE INVENTION

The above-mentioned disadvantages and drawbacks are eliminated by means of the present invention, which more specifically refers to an automatic ticket machine for utilization in parking areas and comprising a casing provided with a coin unit including one or more coin apertures, pushbuttons for requesting a receipt and requesting coin refund, respectively a window for displaying time information and coin denomination information, if desired, and an opening for dispensing a ticket and a refunded coin, respectively. The automatic ticket machine of the invention features (a) a central unit including a time generator, current time registers, outgoing time registers, a temporary coin register, an outgoing coin register, a flag register, a pulse distributor, a supervisory unit, and a data table, furthermore, (b) a display unit including said display window, and (c) a printing mechanism. Said display unit — which is designed such, that by means of the supervisory unit it can be set to three conditions, namely unlit, lit with a steady light, and showing a flashing light, and can be made to indicate electronically the time of the hour in the form of digits and the days of the week in the form of text—shows continuously the contents of the outgoing time register in the form of digits and in the form of text with a steady light, when the automatic ticket machine is unactuated by coins, said register receiving its information in binary coded decimal form by means of the supervisory unit from the current time registers which always contain information on the current time. The current time registers receive their time information in the form of pulses with predetermined intervals and derived from said supervisory unit, said pulses being intiated by the time generator over the flag register. When a coin is introduced into the automatic ticket machine, the supervisory unit initiated by the flag register addresses a portion of the data table, corresponding to the coin, to the pulse distributor, which under the control of the supervisory unit distributes to the temporary coin register a number of pulses corresponding to the value of the introduced coin. The address in the data table is thereafter changed by the supervisory unit to a time portion corresponding to the introduced coin. A number of pulses derived from the time portion code of the data table, corresponding to the coin, are distributed via the pulse distributor to the outgoing time registers, said number of pulses being added to the contents of the outgoing time registers. The addresses of the data table are thereafter changed again by the supervisory unit to a coin denomination portion corresponding to the introduced coin. A number of pulses derived from the coin denomination code of the data table, corresponding to the coin, are added to the outgoing coin register concurrently with the same number of pulses being subtracted from the temporary coin register. The above is repeated until the contents of the temporary coin register are equal to zero, wherein the display unit shows the contents of the outgoing time registers in the form of digits and in the form of text, respectively, in a flashing light. The described process is repeated if a new coin is introduced. When a request for a receipt is performed by external actuation of a pushbutton for requesting a receipt, the control unit is actuated over the flag register, thereby operating a motor of a printing mechanism, so as to perform printing on a ticket advanced therein, with the imprint correspondng to the contents of the outgoing time registers and the outgoing coin register and with the display unit being unlit during the printing process.

BRIEF DESCRIPTION OF THE DRAWINGS

The invention will be described more specifically below with reference to the accompanying drawings, wherein.

DESCRIPTION OF THE PREFERRED EMBODIMENT

Figure 1:
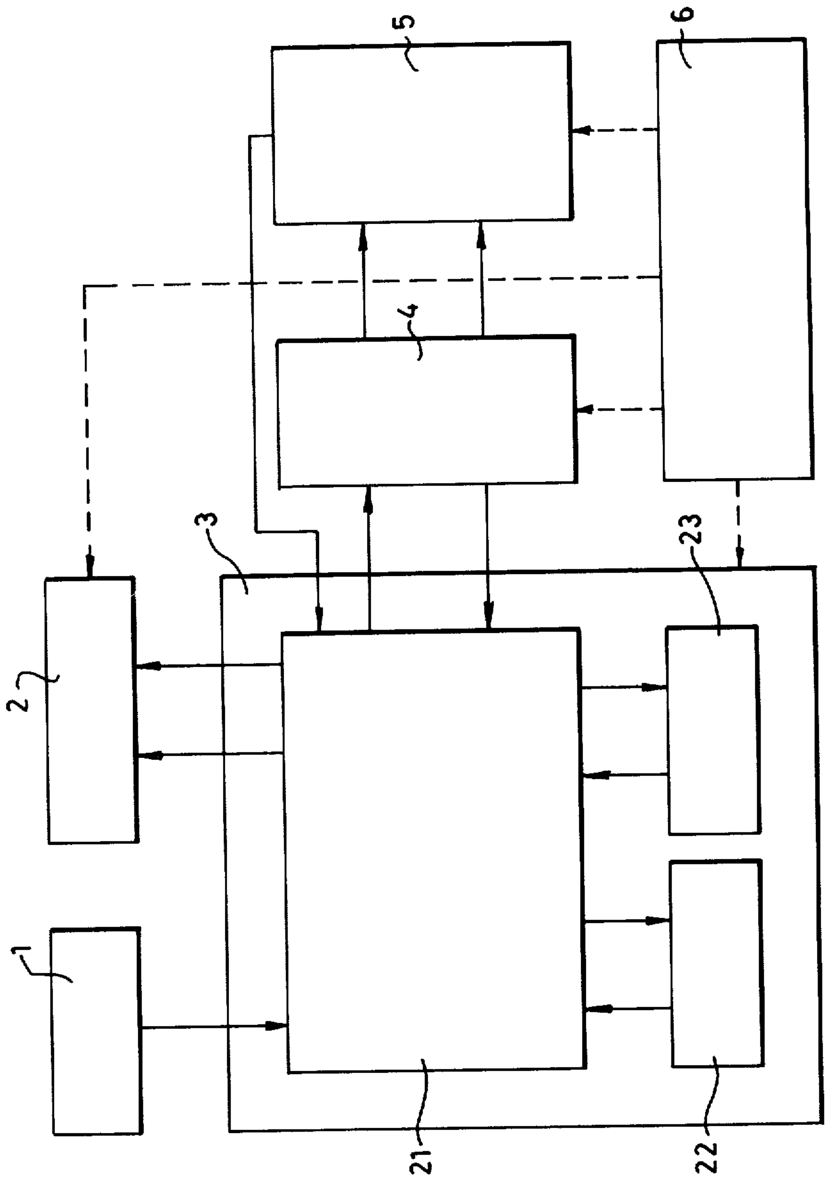
FIG. 1 shows a block diagram illustrating the general layout of the automatic ticket machine in accordance with the invention.
Figure 2:
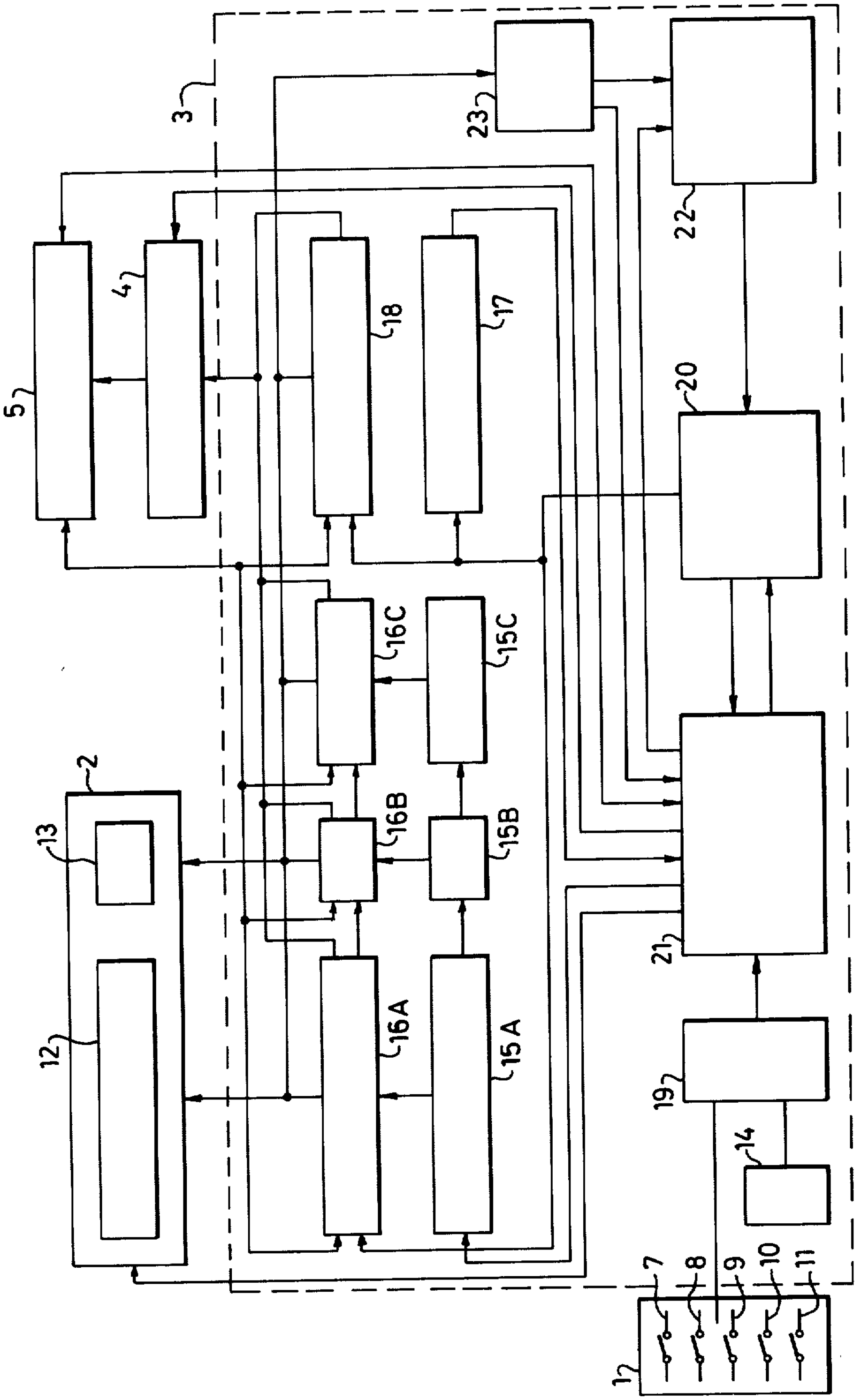
FIG. 2 shows a portion of the blocks of FIG. 1 more in detail.

The automatic ticket machine in accordance with the invention is composed of substantially the following components, which are illustrated in FIG. 1 and partly in FIG. 2, with most of said components operating electronically: (1) coin unit, (2) display unit, (3) central unit, (4) power control unit, (5) printing unit, and (6) mains unit. The electronic units of the automatic ticket machine are composed substantially of integrated circuits of TTL type (transistor-transistor logic), and in addition the power control unit contains a plurality of discrete power amplifiers.

The function of these various units and their most important portions will be described below.

The coin unit 1 may appropriately be disposed on the inside of the front panel of the automatic ticket machine and comprises three coin sensors or slug sensors 7, 8 and 9 for coins or slugs of three different denominations, which may be selected entirely arbitrarily, and said coin sensors may also take the form of one or more automatic currency bill readers. Furthermore, the coin unit 1 includes two pushbuttons 10 and 11 serving as pulsers, one of said pushbuttons, namely 10, comprising a socalled reconsidering button for coin refund and the other pushbutton 11 being intended for requesting a receipt. The purpose of the coin unit 1 is to inform the central unit, after a check concerning the validity of a coin has been carried out, that a coin of a specific denomination is to be processed. When the button 11 for requesting a receipt is actuated a pulse will be sent to the central unit to indicate that a receipt is desired. When the coin refund button 11 is actuated a pulse is sent to the central unit 3 indicating that the coins that have been dropped in are desired back. Alternatively, the pushbuttons 10 and 11 may be excluded, and in such case a receipt will be provided automatically when the necessary number of coins has been introduced.

The display unit 2 is placed on the inside of the front panel of the automatic ticket machine. In an appropriate embodiment of the display unit 2 in accordance with the invention hour and minute information is given by seven-segment digit tubes 12, whereas information on the day is provided by a lamp display 13 illuminating for example a glass plate with the name of the day engraved on it and hence may be adapted to different languages. The digit tubes 12 and the lamps in the lamp display 13 may to advantage be mounted on a circuit board including integrated circuits for controlling and operating the lamps and the digit tubes.

The display unit in accordance with the invention has two functions, one of which is to show the customer the current time and day and the other of which is, after coins have been processed, to show the customer the minute of the hour when the paid parking time will expire. If desired, the last-mentioned functiin may be excluded. In order to make it possible to distinguish between these two information items the current time and day are shown continually, whereas the time when the parking right expires is shown in short intervals, i.e. the digit tubes indicating the minute of the hour when the parking time expires and the lamps indicating the day, respectively, will flash. If desired, the number of the week may also be shown as well as the magnitude of the amount paid. The display unit may to advantage be unlit under the printing process.

The central unit 3 may be considered to be the most important unit in the automatic ticket machine. It consists of a plurality of components, of which the most important ones are the time generator 14, the current time registers 15A, 15B and 15C, the outgoing time registers 16A, 16B, and 16C, the temporary coin register 17, the outgoing coin register 18, the flag register 19, the pulse distributor unit 20, the supervisory unit 21, the data table 22, and the decoding unit 23.

These individual components will be described more specifically below.

In the illustrated embodiment the time generator 14 consists of a quartz crystal oscillator and a frequency subdivider, and its function is to generate an appropriate time pulse, for example one pulse per minute, so that the current time registers 15A, 15B and 15C (up-to-date time registers) may be updated with the assistance of the supervisory unit 21. The time generator is composed of integrated circuits of low power type. Furthermore, it is crystal controlled for the sake of accuracy. The time generator automatically becomes connected to a supply battery if the electric mains should become powerless.

The current time registers 15A, 15B, and 15C, respectively, are supplied in series with pulses from the time generator over the above-mentioned supervisory unit 21, and time register 15A has the function of storing current information on minutes and hours in binary coded decimal form (BCD form), whereas register 15B stores current information on days in binary coded decimal form and register 15C stores current information on the week-numbers in binary coded decimal form. In the illustrated embodiment, register 15A consists of four individual four-bit registers, register 15B is a three-bit register, and register 15C actually comprises two individual four-bit registers. The current time registers may also be charged in parallel with present external information, if desired. This is necessary when the automatic ticket machine is to be started up. Similarly to the time generator, the current time registers are composed of integrated circuits of low power type, and they are fed by a battery if the mains lose their power.

The outgoing time registers 16A, 16B and 16C are accumulating registers which are charged or loaded in parallel from the current time registers 15A, 15B and 15C and are fed in series from the pulse distributor unit 20. The outgoing time registers 16A, 16B and 16C are designed entirely analogously to the current time registers 15A, 15B and 15C, and their function is to provide not only the display unit 2 but also the printing unit 5 with information as to when the parking time will cease and to feed the decoding unit 23 which will be described more specifically below.

The temporary coin register 17 consists of four individual four-bit registers and has the function of storing the denomination (value) of a coin in BCD form until the denomination of the coin has been converted into time and information on the converted time has been stored in the outgoing time registers 16A–16C and also until information on the coin denomination has been accumulated in the outgoing coin register 18.

The outgoing coin register 18 always contains information on the total of accumulated coins until a receipt has been provided or coins have been requested back. Both after a receipt has been provided and coins have been paid back, the outgoing coin register is reset to zero. The outgoing coin register provides information to printing unit 5 and to decoding unit 23 as well as to display unit 2 if desired.

The flag register 19 is composed of a plurality of one-bit registers, and it functions i.a. to store signals from coin unit 1 until supervisory unit 21 has taken care of them.

Pulse distributor unit 20 contains i.a. a code-to-pulse converter which is to generate a number of pulses corresponding to an input code derived from data table 22. These pulses are utilized for coin processing and time conversion.

Supervisory unit 21 controls all activities being performed in the automatic ticket machine, for example updating of the current time register, coin processing, time computing, receipt printing, receipt feedout, etc. Normally no flag register bit is set, and therefore the supervisory unit charges the outgoing time register with current time. The charging is interrupted when one of the flag registers is set, for example as the result of a coin having been introduced. The supervisory unit will then determine which activity this flag register represents and will ensure that the requested activity is carried out.

Data table 22 is disposed on the central unit printed circuit boards. This data table contains address decoders and memory cells, with the cells being addressed on one hand from decoding unit 23 and on the other hand from supervisory unit 21. The cells contain all code information on coin processing and on coin conversion into time, as well as codes for various time modifications. The code is thereafter utilized for actuating the pulse distributor unit 20.

Data table 22 is basically a read-out memory which when delivered is programmed as requested by the customer, but if a change should be required later on it is simple to change the contents of the memory. The data table is divided into three sections, with the first section containing codes for the respective coin denominations (*x*, *y*, *z*), the second section containing necessary codes for conversion from coin to time for the respective coins and codes for updating the outgoing coin registers, and the third section containing for example codes for various free-of-charge time intervals.

Figure 5:
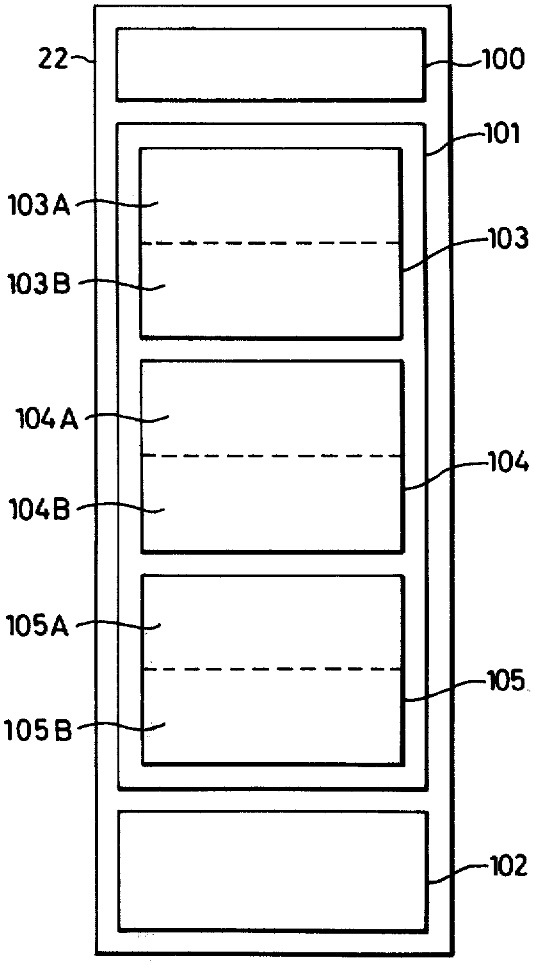
FIG. 5 shows a block diagram illustrating the data table according to the invention.

The three sections of the data table 22 illustrated in FIG. 5 are firstly a section 100, which is capable of storing a coin denomination code for the respective coins, secondly a coin-to-time conversion section 101, which is designed such, that it comprises three subsections 103, 104, 105, one for each respective coin, with said subsections each being divided into two areas, for instance 103A, 103B, namely a time increment area and a coin decrement area, which areas may each store for instance four codes corresponding to four differentiating levels, and thirdly a section 102 being capable of storing a plurality of time codes intended for modifying the contents of the outgoing registers, for example in connection with displacing time over one or more free-of-charge periods.

The decoding unit 23 is also disposed on the central unit circuit board. Its function is to decode the contents of the outgoing registers 16A–16C, 18, and to detect certain predetermined limits, for example that the parking time for which a fee is due begins or terminates, and then to inform the supervisory unit 21 about this as well as to modify the address to data table 22.

The power control unit 4 comprises an intermediate stage between the logic portion and the printing portion of the automatic ticket machine and is composed of logic circuits and power amplifiers, a circuit for alternating voltage control, battery charging circuits, and circuits for supervising battery charging. The power amplifiers control magnets for cashing in coins and for paying back coins as well as the printing magnets. By means of logic circuits the alternating voltage control circuit controls motors for a printing drum and for advancing receipts and severing receipts, respectively.

Figure 3:
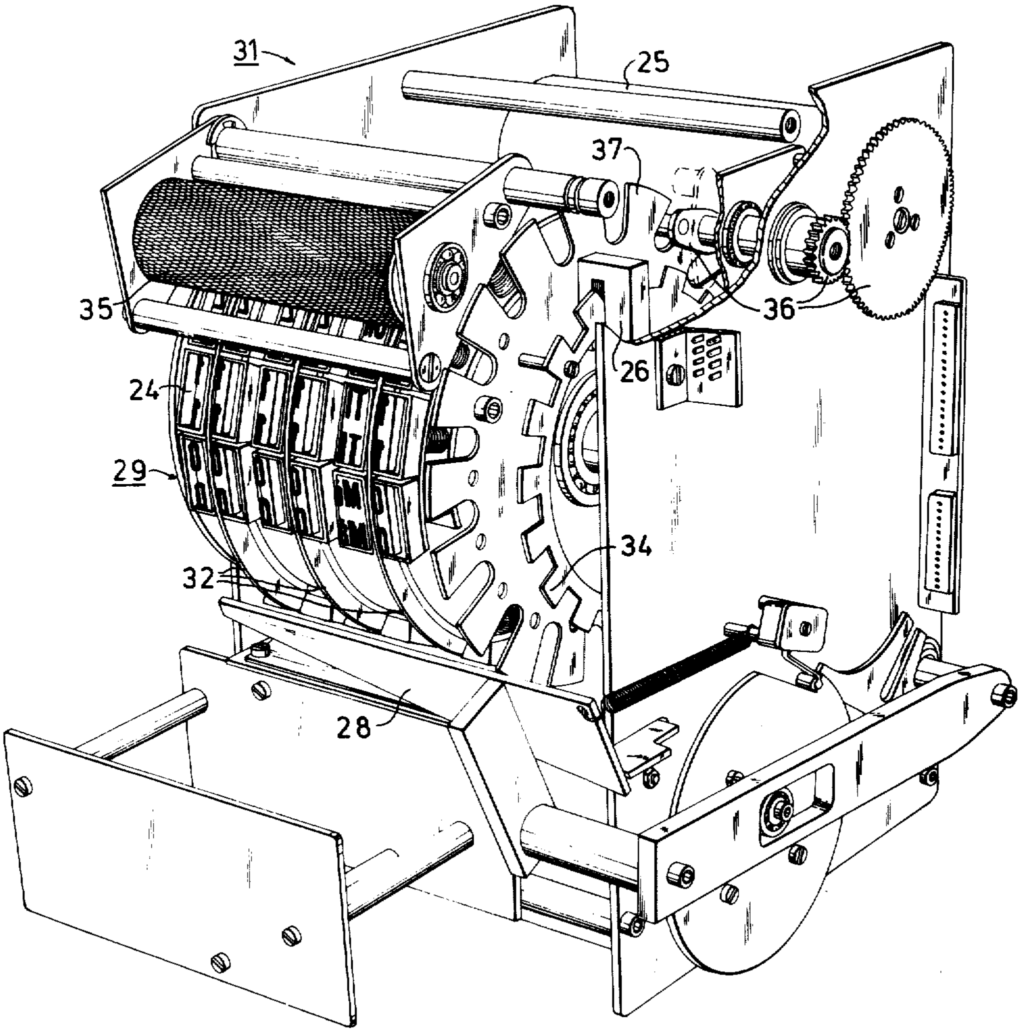
FIG. 3 shows a perspective view of a printing unit which is utilized in accordance with the invention.
Figure 4:
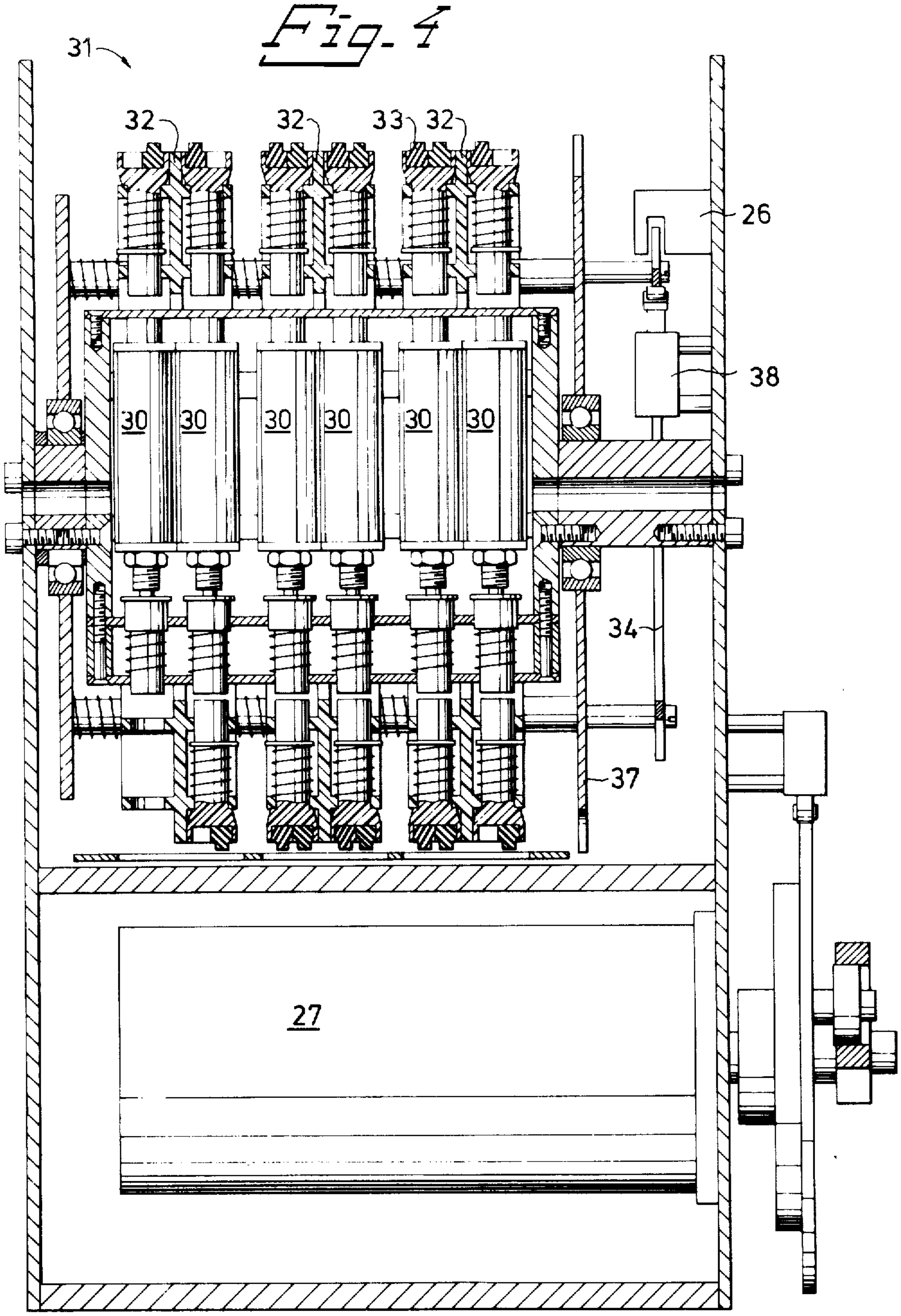
FIG. 4 shows a view, partly in section, taken from the front of the printing unit according to FIG. 3.

The printing unit 5 is illustrated in FIGS. 3 and 4 and consists of a drum 29 divided into segments and being operated step by step by a motor 25 in manner which will be described more in detail below. The segments are provided with radially movable rubber types which are actuated by printing magnets for printing. The design of the rubber types in accordance with the invention enables double printing on the receipt, i.e. identical information in doubled form. A pulser 26 is associated with the drum 29 and provides the central unit 3 with continuous information concerning the position of the drum when the drum rotates. When the drum has rotated one revolution and stopped there a receipt feedout/severing motor is made to operate. This motor has the functions of both advancing the receipt and severing the latter from an elongated strip. The design and operation of the printing unit will be explained more specifically below. The mains unit 6 illustrated in FIG. 1 is of conventional type and has the purpose of generating the necessary direct and alternating currents. It will not be described in detail here.

A more specific description of the operation of an embodiment of the automatic ticket machine in accordance with the invention will now be provided.

As has been mentioned above, the coin unit 1 comprises three coin sensors 7, 8, and 9, a pushbutton 10 for coin payback, and a pushbutton 11 for requesting a receipt.

When a coin has been introduced into a coin aperture in the front panel of the automatic ticket machine said coin passes through a channel in which it is checked with regard to weight, dimensions and composition in manner known per se. After the coin has been approved it passes a pulsing device which provides central unit 3 with a signal that a coin having a given denomination has been approved. The automatic ticket machine may for instance be provided with three such pulsing devices for arbitrary coin denominations. Alternatively one or more of these pulsing devices may be replaced by an automatic bill reader.

The display unit 2 contains (*a*) code converters for converting information in the outoing time registers 16A–16C into seven-segment codes for controlling the digit tubes and (*b*) a one-of-seven decoder for controlling the lamps providing information on the current day. Furthermore, the display unit contains logic circuits for controlling the converters and the decoder and for providing such functions as flashing, extinguishing and continuous operation of the digit tubes and the lamps, respectively. The display unit also includes two lamps for specific indications, such as "supply of receipts exhausted" and "machine in operation".

As has been mentioned above, i.a. the supervisory unit 21, the data table 22, and the decoding unit 23 are included in the central unit 3.

The control unit 21 ensures that the automatic ticket machine carries out its various operations in the correct order. The supervisory unit operates in two phases, namely a search phase (phase 1) and an execution phase (phase 2). During phase 1 the control unit determines the type of routine, i.e. activity, which is in its turn to be performed. Each routine has an individual one-bit register which is actuated from the coin unit 1 and the time generator 14 asynchronously with respect to supervisory unit 21. These one-bit registers are electrically connected to the supervisory unit, and their positions of connection correspond to a predetermined routine request.

The various routines have different priority levels in processing. In phase 2, i.e. the execution phase, supervisory unit 20 performs the routine that has been indicated in phase 1, i.e. the search phase.

The following routines are used:

Routine 1. Transferring the information of the current time registers 15A–15C to the outgoing time registers 16A–16C. This routine corresponds to the automatic ticket machine being in its quiescent state.

Routine 2. Updating the current time register 15A–15C from the time generator 14 once per minute.

Routine 3. Registering coins of each of the three relevant denominations in the temporary coin register 17.

Routine 4. Converting coins of the relevant denominations $x$, $y$, $z$, into time and updating the outgoing time registers 16A–16C with the time derived.

Routine 5. Initiating receipt printing.

Routine 6. Initiating receipt feedout and receipt severing.

Routine 7. Initiating coin payback.

A more detailed description of each routine will be given below.

Routine 1. Normally the supervisory unit 21 is in standby position when no one-bit register in the flag register is actuated and no coin is registered. The supervisory unit is clamped to the highest priority level corresponding to routine 1. During the search phase of the control unit routine 1is detected, and during the execution phase following thereupon the contents of the current time registers 15A, 15B, and 15C, respectively, are transferred to the corresponding outgoing time registers. Display unit 2, which shows the contents of the outgoing registers, indicates the current time, i.e. it shows the time of the hour, and it indicates the relevant day of the week.

As soon as one of the one-bit registers is actuated, for example by a coin being introduced, the clamping of the supervisory unit will be cancelled so that the supervisory unit will be released of routine 1 and will search for the relevant one-bit register and will be clamped again in a position corresponding to the position of the one-bit register.

During the execution phase which now follows, the now-relevant routine which is determined by the one-bit register is performed, whereafter the supervisory unit continues to search for additional one-bit registers that are set in lower and lower priority levels.

After the lowest level the supervisory unit returns to the highest priority level (= routine 1). Clamping again on this level can only occur if no coin processing has been performed.

Routine 2. When time generator 14 has run 1 minute it delivers a pulse which sets its one-bit register. If the supervisory unit is not occupied at that time by any one of routines 3, 4, 5, 6, or 7, respectively, and is in standby state (= routine 1), the one-bit register of the time generator will initiate the search phase of the control unit. The one-bit register is found, and the current time registers 15A–15C are advanced by a pulse corresponding to 1 minute during the execution phase. In computer terms this is expressed in the following manner: $(ATR = ATR + 1)$. The control unit continues to search for other routines which have been requested by a one-bit register having been set, for example in consequence of a coin having been introduced. If no request for a routine is found, the supervisory unit returns to its standby state. If, conversely, the supervisory unit is occupied by one of the remaining routines the updating of the current time registers is delayed until the routines have been completed.

Updating the current time registers may also be carried out without the assistance of the control unit when interruptions in the electric current occur, as the one-bit registers of the time generator are not set under such circumstances, and the minute pulse actuates the current time registers directly.

Routine 3. Each coin denomination has an individual one-bit register. If one of the one-bit registers is set, the search phase is initiated by the supervisory unit. By means of the priority of the one-bit register found, the supervisory unit knows which coin denomination is to be processed. During the execution phase a memory position within section 1 of data table 22 corresponding to the relevant coin is addressed. The contents of the memory position — equal to the code corresponding to the coin — are read out to the pulse distributor unit 20, which thereafter updates the temporary coin register 17. The temporary coin register now contains information on the relevant coin denomination. The routine is terminated here, and the supervisory unit is compelled to begin with routine 4.

Routine 4. This routine is always a consequence of routine 3 having been performed. In the search phase the supervisory unit is clamped in a position corresponding to routine 4, and the execution phase begins.

Routine 4 has two functions, namely (a) to convert the coin denomination into time and to add the time resulting thereby to the outgoing time registers 16A–16C and (b) to add the contents of the temporary coin register 17 to the outgoing coin register 18.

The time conversion is carried out in such manner that supervisory unit 21 addresses section 2 of data table 22, from which codes for time increments ($\Delta T$) and coin decrements ($\Delta M$) are read out to the pulse distributor unit 20. "Time increment" refers to a short interval of time, and "coin decrement" refers to a small coin quantity.

$\Delta T$ is added to the contents of the outgoing time registers, and $\Delta M$ is added to the outgoing coin register and subtracted from the temporary coin register.

The above continues alternately until the contents of the temporary coin register 17 are equal to zero.

After each alternate processing the decoding unit 23 determines whether certain predetermined limits have been reached, such as for example (a) the maximum parking time, wherein an indication is given if a time period corresponding to the maximum parking time has been provided, furthermore (b) a change of rate as the result of the contents of the outgoing time registers 16A–16C corresponding to a predetermined moment after which the rate is to be changed, (c) a change of rate as the result of the contents of the outgoing coin register 18 corresponding to a predetermined amount, and (d) a free-of-charge time interval begins.

If the maximum parking time has been reached, all further updating of the outgoing time registers 16A–16C is inhibited, whereas the updating of the outgoing coin register 18 is continued and is terminated when the contents of the temporary coin register become zero. A one-bit register is concurrently set as a flag for requesting a receipt (= routine 5).

A change of rate because of time or coins as indicated above causes a change of the differentiating levels which correspond to predetermined addresses in the data table 22, whereby the code of the new rate is obtained.

Detecting a free-of-charge time interval results in adding a predetermined time quantity to the contents of the outgoing time registers. The code of the time quantity is derived from section 3 of the data table, whereafter the normal time processing continues.

Routine 5. The one-bit register for requesting a receipt can be set either manually by the pushbutton 11 of coin unit 1 or automatically during routine 4 (see above) on the condition that coins are registered in the outgoing coin register 18. Supervisory unit 21 detects the one-bit register and starts motor 25 over power control unit 4, said motor operating printing drum 29 until the drum has completed one revolution. During said revolution a receipt is printed asynchronously with supervisory unit 21.

Cashing in coins is also carried out during routine 5. The actual printing process will be described more specifically below.

Routine 6. This routine is always a consequence of routine 5 having been executed. A receipt-feedout motor 27 (FIG. 4) is operated and advances the receipt via power control unit 4 and mechanically actuates shears 28 which sever the receipt.

Routine 7. After coin processing but prior to receipt printing having been initiated it is always possible for the relevant motorist to request back the coins that have been introduced by pressing the coin payback button 10 in coin unit 1, whereby the one-bit register for coin payback is set. Supervisory unit 21 detects the set one-bit register and actuates a magnet over power control unit 4, said magnet having the function of refunding the coins. This refunding operation may also occur if the electric current is interrupted, but in such case it is not under the supervision of the supervisory unit.

In the illustrated embodiment the actual printing process is carried out by printing motor 25 being operated during routine 5, whereby printing drum 29 is indexed 16 steps. The drum is provided with a pulser 26 for delivering one pulse for each step that has begun. This pulse indicates that the digit 1 is to be subtracted from the outgoing time registers and the outgoing coin register, respectively, for each step that has been started. Each individual register included in the outgoing time registers and the outgoing coin registers, respectively, is checked with regard to its contents. When the contents are equal to 0, one or more magnets 30 in the printing mechanism are actuated over power control unit 4 in response to the relevant digit position.

The printing mechanism 31 (FIGS. 3 and 4, respectively) consists of the main units of printing motor 25, receipt feedout/severing motor 27, typewheels 32, type supports including types 33, pulse disc 34, pulser 26, inking roller 35, shears 28, feed mechanism 36, driving disc 37, and printing magnets 30. The above-mentioned printing drum 29 comprises the driving disc 37, the pulse disc 34, and the type supports including the types 33.

The individual units operate as follows: By means of feed mechanism 36 and driving disc 37, printing motor 25 drives the typewheels one revolution, whereafter the motor stops under the actuation of a switch 38.

The receipt feedout/severing motor 27 operates to advance the receipt after completed receipt printing and thereafter to sever said receipt by means of the shears 28.

There are three typewheels 32, which are mechanically coupled to driving disc 37. Each typewheel has space for a maximum of 2 × 16 type supports, including types, with 16 types on each side of the typewheel.

Each typewheel contains rubber types which are intended for single or double printing, as the automatic machine is to be capable of providing a receipt having two portions with identical imprints, so that the customer can retain one of said portions as a reminder of the period of the parking time whereas he places the other portion in his automobile well visible from the outside. The type supports are mounted on the typewheels in such manner as to be displaceable radially.

Pulse disc 34 is mechanically coupled to driving disc 37 and is designed as an indexing wheel in the illustrated embodiment. It operates to actuate the pulser 26 once for each step the typewheel is advanced, with pulser 26 delivering a pulse to the central unit 3 for each indexing step.

Inking roller 35 is an ink absorbent rubber roller which provides the rubber types with ink necessary for the printing.

The shears 28 are operated by means of the receipt feedout/severing motor 27 and execute the severing of the receipt.

Driving disc 37 has the form of an indexing wheel (compare FIG. 3) and indexes the typewheels when printing motor 25 rotates.

Feed mechanism 36 is coupled to motor 25 and operates driving disc 37.

There are six individual printing magnets 39, and these are mounted in the interior of printing drum 29. The purpose of the printing magnets is to actuate the displaceable type supports according to FIG. 4 by means of one or more pulses from the outgoing time registers 16A, 16B, and 16C, respectively, and the outgoing coin register 18 over power control unit 4.

The mechanical portion of the printing process is performed in the following manner.

When motor 25 is brought into operation by power control unit 4, printing drum 29 is made to rotate. The type supports of the printing drum are disposed in such manner that positions 1–10 are utilized for type supports which are to print the units digits 0–9 and positions 11–16 are utilized for printing the tens digits 0–5. Hence the largest numerical value that may be printed by means of positions 1–16 is 59.

It may for example be appropriate to have the following information printed on a receipt:

number of the week, no more than two digits day of the week, 2–3 letters outgoing time and current time, alternatively, four digits charge, four digits.

The first typewheel is utilized for printing the number of the week and the days of the week. For the number of the week, 54 is the largest number which is to be printed, which is possible. For the days of the week seven different combinations are necessary. Type supports containing types provided with text instead of digits are disposed in positions 1–7. Hence it is possible to select text combinations according to the language area to which the customer belongs. The type supports for the number of the week and the days of the week are placed one on each side of the typewheel.

The second typewheel is utilized for printing hours and minutes. For hours the greatest number is 23. The type supports of the units of hours (0–9) are disposed in positions 1–10, and the type supports of the tens of hours (0–2) are placed in positions 11–13. The hour type supports are placed on one side of the typewheel, and the minute type supports lie on the other side of the typewheel. The largest number is 59. Positions 1–10 are utilized for the units of minutes (0–9), and positions 11–16 are utilized for the tens of minutes (0–15).

The third typewheel is utilized for coin information. As is indicated above, the largest integer coin can be 59. The type supports of the units and tens of coins are each placed on one side of the typewheel as indicated above.

We claim:

1. An automatic ticket machine for utilization in parking areas and comprising a casing provided with a coin unit including one or more coin apertures, pushbuttons for requesting a receipt and requesting coin refund, respectively, a window for displaying time information and coin denomination information, if desired, and openings for dispensing a ticket and a refunded coin, respectively, wherein said automatic ticket machine comprises:

a. a central unit including a time generator, current time registers, outgoing time registers, a temporary coin register, an outgoing coin register, a flag register, a pulse distributor, a supervisory unit, and a data table;

b. a display unit including said display window; and c. a printing mechanism;

said supervisory unit operative to set said display unit to one of three conditions, namely unlit, lit with a steady light, and showing a flashing light, and operative to indicate electronically the time of the hour in the form of digits and the days of the week in the form of text; said display unit, when the automatic ticket machine is unactuated by coins, continuously showing the contents of the outgoing time register in the form of digits and in the form of text with a steady light; said outgoing time register receiving its information in binary coded decimal form by means of the supervisory unit from the current time registers, which always contain information on the current time; said current time registers receiving their time information in the form of pulses with predetermined intervals and derived from said supervisory unit, said pulses being initiated by the time generator over the flag register; said supervisory unit initiated by the flag register for addressing a portion of the data table, corresponding to an insert coin; the pulse distributor, upon a coin being introduced into the automatic ticket machine and under the control of the supervisory unit, distributing to the temporary coin register a number of pulses corresponding to the value of the introduced coin; an address in the data table thereafter being changed by the supervisory unit to a time portion corresponding to the introduced coin, a number of pulses being derived from the time portion code of the data table, corresponding to the coin, and being distributed via the pulse distributor to the outgoing time registers, said number of pulses being added to the contents of the outgoing time registers; the addresses of the data table thereafter being changed again by the supervisory unit to a coin denomination portion corresponding to the introduced coin, a number of pulses derived from the coin denomination code of the data table, corresponding to the coin, being added to the outgoing coin register concurrently with the same number of pulses being subtracted from the temporary coin register; the above being repeated until the contents of the temporary coin register are equal to zero, so that the display unit shows the contents of the outgoing time registers in the form of digits and in the form of text, respectively, in a flashing light; the described process being repeated upon a new coin being introduced; and, when a request for a receipt is performed by external actuation of a pushbutton for requesting a receipt, the control unit being actuated over the flag register, thereby operating a motor of a printing mechanism, so as to perform printing on a ticket advanced therein, with the imprint corresponding to the contents of the outgoing time registers and the outgoing coin register with the display units being unlit during the printing process.

2. An automatic ticket machine in accordance with claim 1, wherein said time generator is a crystal-controlled oscillator with a frequency subdivider.

3. An automatic ticket machine in accordance with claim 1, wherein said current time registers are operatively fed in series and are charged in parallel, respectively, and can be upcounted.

4. An automatic ticket machine in accordance with claim 1, wherein said outgoing time registers are operatively fed in series and are charged in parallel, respectively, and can be upcounted and downcounted, respectively.

5. An automatic ticket machine in accordance with claim 1, wherein said temporary coin register is operatively fed in series and can be upcounted and downcounted, respectively.

6. An automatic ticket machine in accordance with claim 1, wherein said outgoing coin register is operatively fed in series and can be upcounted and downcounted, respectively.

7. An automatic ticket machine in accordance with claim 1, wherein said flag register comprises a plurality of one-bit registers.

8. An automatic ticket machine in accordance with claim 1, wherein said pulse distributor is provided with a code from the data table and converts this code into pulses and distributes the pulses to the temporary coin register, the outgoing time register and the outgoing coin register by means of the supervisory unit.

9. An automatic ticket machine in accordance with claim 1, comprising a decoding unit having the functions of decoding the contents of the outgoing register and of detecting certain predetermined limits and then of informing the supervisory unit of these as well as modifying the address to the data table.

10. An automatic ticket machine in accordance with claim 1, wherein said data table is divided into three sections, one of which contains codes for the respective coin denominations, the second of which contains necessary codes for conversion from coin to time for the respective coins and codes for updating the outgoing coin registers, and the third of which contains codes for various free-of-charge time intervals.

11. An automatic ticket machine in accordance with claim 10, wherein said second one of said sections is designed such, that it contains three subsections for the respective coins, each of said subsections being divided into two areas, namely a time increment area and a coin decrement area, said areas each being operative to store four codes corresponding to four differentiating levels.

12. An automatic ticket machine in accordance with claim 1, wherein said printing is performed via said motor in such manner that a printing drum is indexed 16 steps, said drum being provided with a pulser which for each step that has been initiated delivers a pulse causing the digit 1 to be subtracted from the outgoing time registers and from the outgoing coin register, respectively, for each initiated step, with each individual register included in the outgoing time register and the outgoing coin register, respectively, being checked with regard to its contents and when the contents are equal to zero one or more magnets of the printing mechanism being actuated in response to the current digit position.

13. An automatic ticket machine in accordance with claim 12, wherein said printing mechanism as its main units comprises a printing motor, a receipt feedout and severing motor, typewheels, type supports including types, a pulse disc, a pulser, an inking roller, shears, a feed mechanism, a driving disc, and printing magnets; said printing drum comprising the driving disc, the pulse disc and the type supports including the types; the printing motor being operable to cause the feed mechanism and the driving disc to drive the typewheels one revolution, whereafter the motor is stopped by means of a switch; the receipt feedout and severing motor having the function of advancing a receipt after completed receipt printing, said receipt thereafter being severed by means of said shears; said typewheels being in a number of three, which are mechanically coupled to said driving disc; each typewheel comprising a maximum of 16 types on each side of the typewheel, each type support comprising rubber types which are intended for printing in single or double form without advancing the receipt when printing in double form occurs, whereby the automatic machine can be made to deliver a receipt with one imprint or with two identical imprints; the type supports being mounted on the typewheels in such manner that they are displacable radially under the influence of said printing magnets; the feed mechanism being coupled to the printing motor and driving the driving disc, to which said pulse disc is mechanically coupled; said driving disc being designed as an indexing wheel which indexes the typewheels when the printing motor rotates and said pulse disc actuating the pulser in each step the typewheels are indexed, said pulser delivering a pulse to the central unit in each indexing step; the inking roller being an ink absorbent rubber roller which provides the rubber types with the ink necessary for the printing; there being six printing magnets mounted in the interior of the printing drum and operable to actuate the displaceable type supports by means of one or more pulses from the outgoing time registers and the outgoing coin register; and said printing drum being made to rotate when the printing motor is brought into operation.

14. An automatic ticket machine in accordance with claim 13, wherein said type supports of the printing drum are disposed in such manner relative to said 16 positions on each side of said typewheel such that a first plurality of consecutive predetermined positions 1–10 of the printing drum are intended for type supports which respectively consecutively print the units, digits 0–9 and whereas a second plurality of consecutive ones of said 16 positions, designated as positions 11–16 of the printing drum, respectively consecutively print the tens digits 0–5.

* * * * *